INVENTOR.
FRITZ A. GUERTH
BY Howard J. Murray, Jr. AGENT
Q. Baxter Warner
ATTORNEY 3,474,433
Patented Oct. 21, 1969

3,474,433

MAGNETIC TAPE READOUT ASSEMBLY EMPLOYING TWO SETS OF ANGULARLY DISPLACED HEADS

Fritz A. Guerth, 1707 W. 27th St., South Shores, San Pedro, Calif. 90732

Continuation-in-part of application Ser. No. 220,103, Aug. 28, 1962. This application Aug. 31, 1966, Ser. No. 576,794
Int. Cl. G11b *5/12, 5/30*
U.S. Cl. 340—174.1 5 Claims

ABSTRACT OF THE DISCLOSURE

An arrangement for representing intelligence as a function of the instantaneous angular orientation of a linear trace developed on the screen of a cathode ray tube, such intelligence determining the amplitude relationship between a pair of sine wave voltages which have been recorded 180° out of phase on a magnetic tape in two laterally spaced regions thereof. The invention read-out structure comprises four heads arranged in two sets, with two parallel heads of one set forming an angle of 90° with the remaining two heads of the other set, each set of heads lying at an angle of 45° to the direction of tape movement. The entire head assembly is cyclically displaced transverse to the longitudinal axis of the tape so as to effectively scan the surface thereof.

The invention described herein may be manufactured and used by or for the Government of the United States of America for governmental purposes without the payment of any royalties thereon or therefor.

The present application constitutes a continuation-in-part of application Ser. No. 220,103, filed Aug. 28, 1962, now abandoned.

The present invention relates in general to the retrieval of information, and particularly to situations where intelligence is converted into a form other than that in which it is originally developed.

It is known in the art that the face plate of a cathode-ray tube may be formed with a plurality of extremely small conductive areas upon which the electron scanning beam of the tube impinges when the beam is selectively deflected so as to be in exact alignment therewith. Under such condition of alignment, the electron beam, impinging a particular area, will develop a pulse in the output circuit of the tube. This arrangement is particularly suitable for the conversion of input information into digital form, since many output pulses may be generated during each cyclic deflection of the beam if the conductive areas of the face plate are so located as to coincide with the sweep pattern. Moreover, by effecting positional displacements of the beam, different digital "readouts" are obtained.

In a system utilizing a linear beam trace, variations in input data normally result in an angular movement of the trace, the amount of such movement generally being a function of the applied signal. In order that the resolving ability of the apparatus be high, it is necessary that exact linearity of the trace be maintained throughout the operating interval, or screen which has an instantaneous angular position in accordance with the phase relationship of the deflection voltages. The invention further embraces the recordation of the two sine waves as separate magnetic impressions angularly oriented upon a tape (or other storage medium) which is capable of movement relative to a stationary readout assembly such that a rotation of the developed trace is brought about by a movement of the tape in either longitudinal direction relative to the readout unit. In accordance with a further feature of the invention, the development of the linear trace is accomplished *while the tape remains stationary* through a cyclic oscillation of the readout assembly in a direction essentially transverse to the general direction of tape movement, thus "reading out" the magnetic tape impressions representing the two sine waves which were previously recorded thereon.

One object of the present invention, therefore, is to provide an improved method and apparatus designed for the retrieval of information.

A further object of the invention is to provide a system particularly adapted to convert analogue data to digital form.

An additional object of the invention is to provide means for yielding output pulse signals in accordance with the instantaneous angular position of the scanning beam of a cathode-ray tube when such beam is so deflected as to develop a trace which is linear under all operating conditions.

A still further object of the invention is to provide a system for direct or digital readout and incorporating a cathode-ray tube to the deflecting plates of which is applied a pair of sine wave voltages having a particular amplitude and phase relationship, the amplitude relationship varying in a predetermined manner so as to effect a displacement of the point of impingement of the scanning beam upon the tube target area.

Other objects and many of the attendant advantages of this invention will be readily appreciated as the same becomes better understood by reference to the following detailed description when considered in connection with the accompanying drawings wherein:

FIGS. 1*a*, *b* and *c* are a schematic illustration of the viewing screen of a cathode-ray tube, illustrating various linear traces which may be effected by selective deflection of the tube electron scanning beam;

Figure 8A:
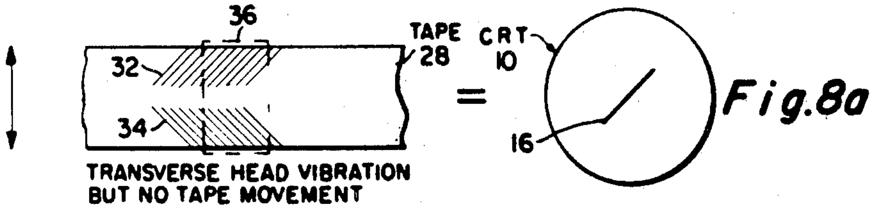
Figure 7:
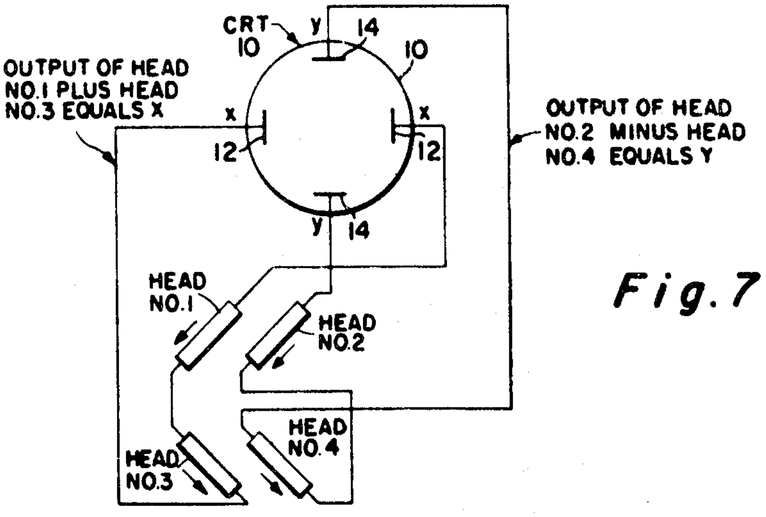
FIG. 7 is a schematic circuit diagram of the electrical connections between the readout unit of FIG. 6 and the deflecting plates of the cathode-ray tube illustrated in FIG. 1.
Figure 9:
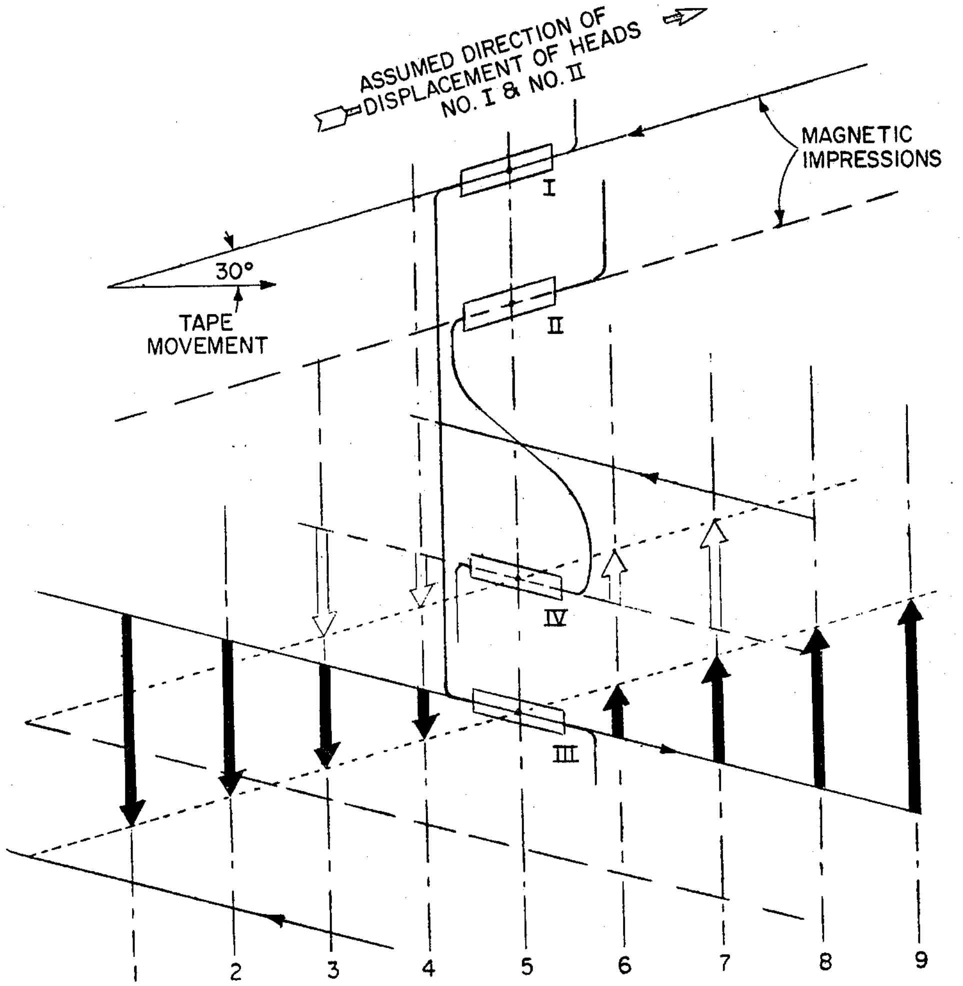
Figure 11:
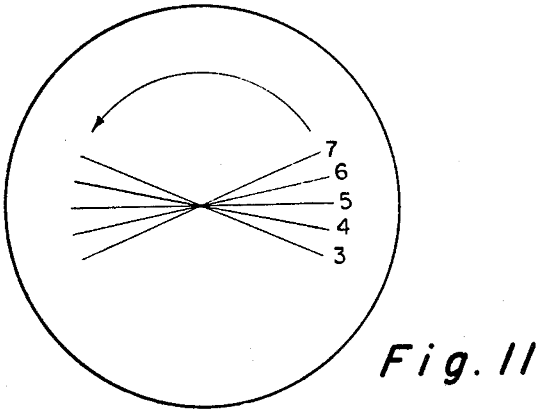
Figure 12:
Figure 10:
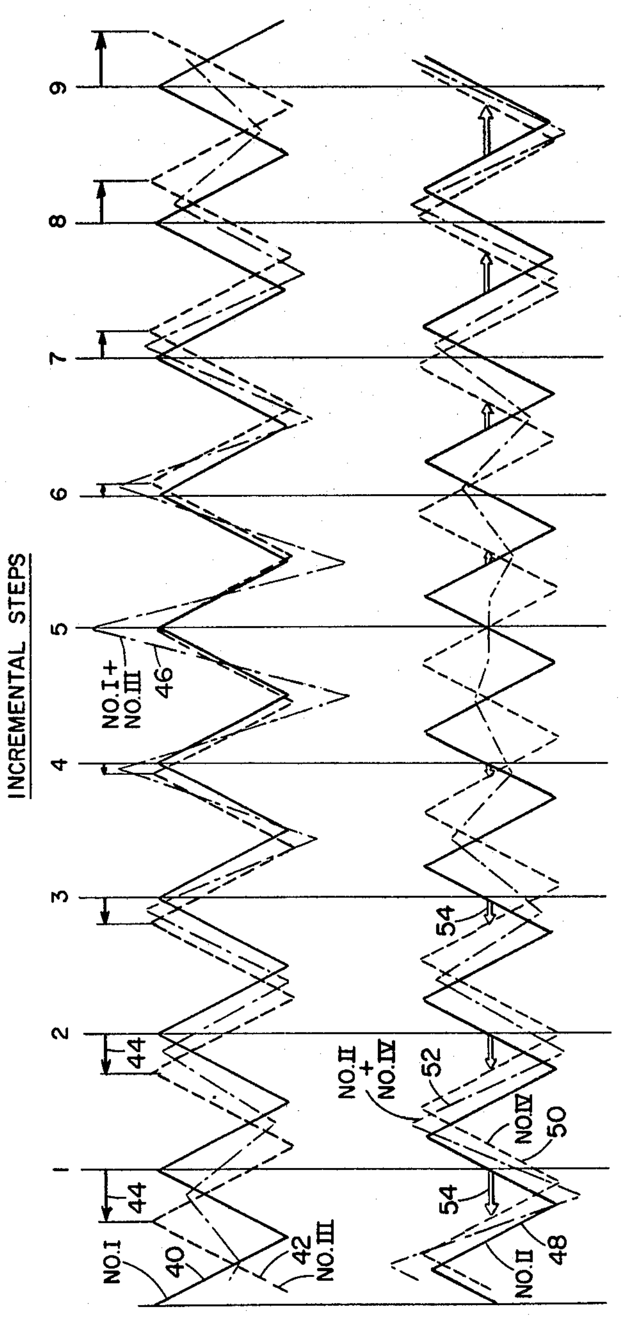
Figure 13:
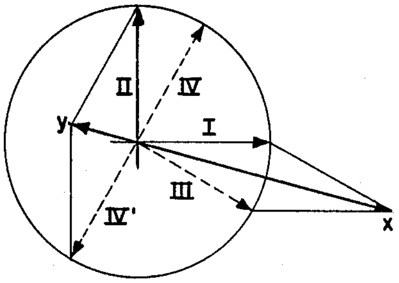
Figure 14:
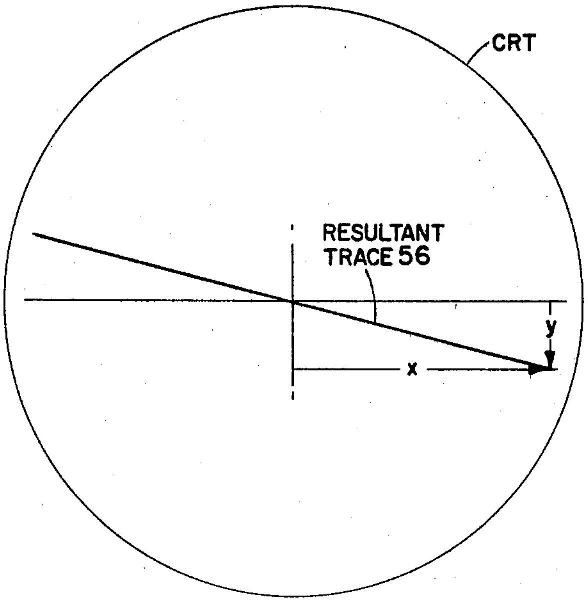
Figure 15:
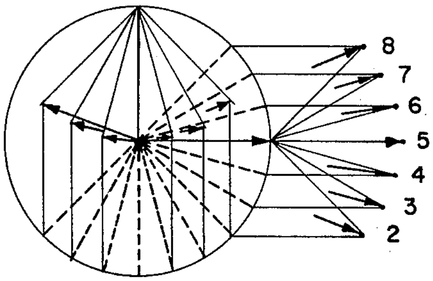
Figure 16:
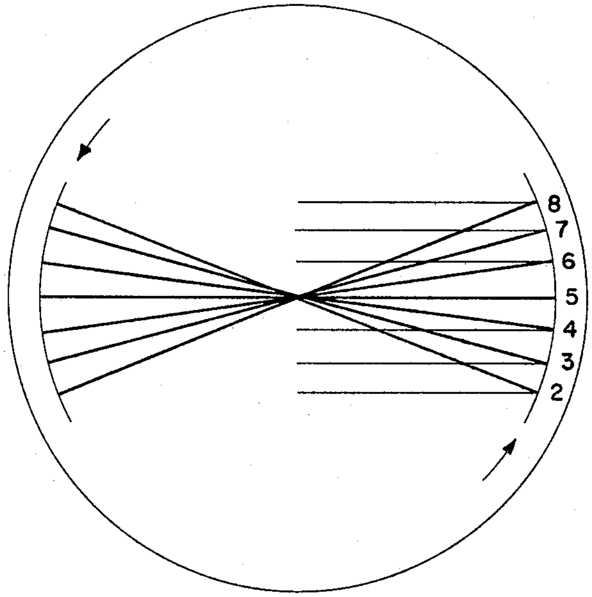

FIGS. 8*a*, *b* and *c* illustrate the manner in which different relative movements between the magnetized tape and the readout unit cause a change in the positional status of the linear trace developed by the cathode-ray tube electron scanning beam;

FIG. 9 is a diagram illustrating the manner in which the phase relationship between the various heads of FIG. 7 undergoes a change when a relative displacement occurs between such heads and the tape in the direction of movement of the latter;

FIG. 10 shows the respective wave outputs of the heads of FIG. 9 during a movement of the tape, bringing out the resulting variation in phase therebetween from zero to 180°;

FIG. 11 illustrates how the phase change shown in FIG. 10 causes the cathode-ray tube trace to rotate in a counterclockwise direction;

FIG. 12 brings out the manner in which the linear trace developed on the cathode-ray tube is made up of a number of increments rather than one continuous line;

FIGS. 13 and 15 are diagrams representing an alternative manner of explaining the operation of the invention, this expedient employing a vector analysis of the data developed by a relative movement between the head unit and the storage medium; and FIGS. 14 and 16 are schematic illustrations of the viewing screen of a cathode-ray tube, bringing out the manner in which the data of FIGS. 13 and 15, respectively, is reproduced.

Figures 1A, 1B, 1C:
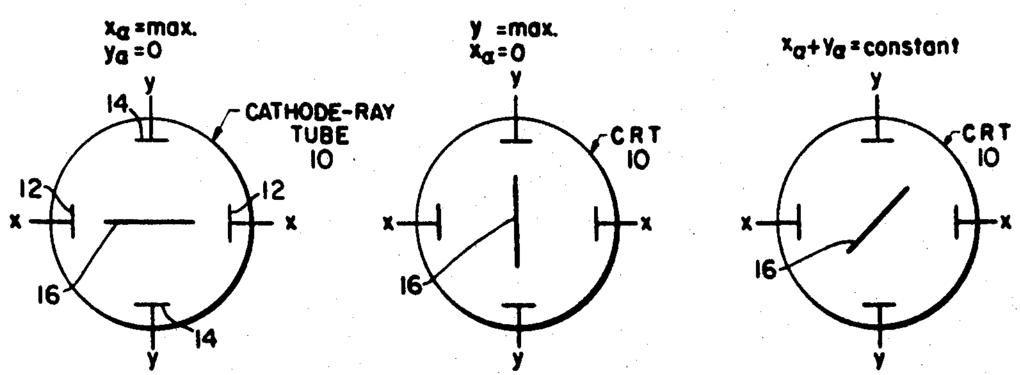
Figure 2:
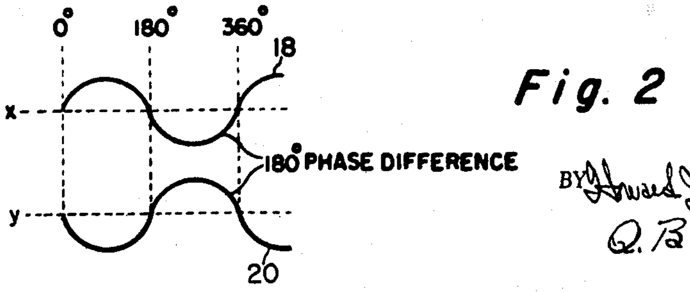

Referring now to the drawings, there is shown in FIG. 1 the viewing screen of a cathode-ray tube 10 which is set forth more or less schematically in a manner sufficient for an understanding of the present invention. The embodiment to be described will be directed to the presentation of data pictorially on the tube screen, but the incorporation in tube 10 of an apertured face plate for digital readout is optional and is an expedient well known in the art to which the concept relates. Tube 10 in the usual fashion includes a pair of horizontal deflection plates 12 and a pair of vertical deflection plates 14. As is well understood in the art, deflection of the cathode-ray scanning beam (not shown) of tube 10 by a voltage applied to plates 12 is termed a deflection along its X axis, while deflection of the scanning beam by a voltage applied to plates 14 is termed a deflection along tube's Y axis. Accordingly, if the amplitude of the horizontal deflection voltage ($X_a$) is maximum and the vertical deflection voltage ($Y_a$) is zero, then the developed trace will be linear and extend horizontally as shown in FIG. 1*a*. Conversely, if $Y_a$ is maximum and $X_a$ is zero, the developed linear trace will extend vertically as shown in FIG. 1*b*. When the two voltage amplitudes $X_a$ and $Y_a$ are equal, then the linear trace lies at an angle of 45° as shown in FIG. 1*c*. In all of the examples of FIG. 1, the two varying voltages applied to the respective deflecting plates must possess and *maintain* a phase difference therebetween of zero or 180° as shown in FIG. 2, as otherwise the trace 16 of FIG. 1 will not be linear but instead will take the form of an ellipse. All of the above, however, is well known to persons skilled in this particular field of technology.

If it is desired to develop and maintain this linear trace 16 while at the same time effecting an angular rotation thereof in accordance with changes in the relative amplitudes of the applied X and Y voltages, it is necessary that the zero or 180° phase difference between the respective sine waves be maintained and also that the total deflection $\sqrt{(X_a^2 \text{ plus } Y_a^2)}$ remain constant. These requirements are schematically presented in FIG. 3 of the drawings, where the two sine waves 18 and 20 (representing X and Y, respectively), are shown as being in unchanging phase opposition. Furthermore, in FIG. 3 the envelope 22 represents the instantaneous amplitude of sine wave X, while the envelope 24 represents the instantaneous amplitude of sine wave Y. From this figure it will now be seen that at any instant of time the vectorial sum of the amplitudes of the two sine waves (that is, $X_a^2$ plus $Y_a^2$) is the same. This means that the length of the trace 16 in FIG. 1 is unvarying, while its angular position is dependent upon the time instant (see FIG. 3) at which the deflection voltages are effective. The present invention, in a preferred embodiment, discloses an unusually simple and efficient arrangement by means of which the above-mentioned objectives may be achieved.

Figure 4:
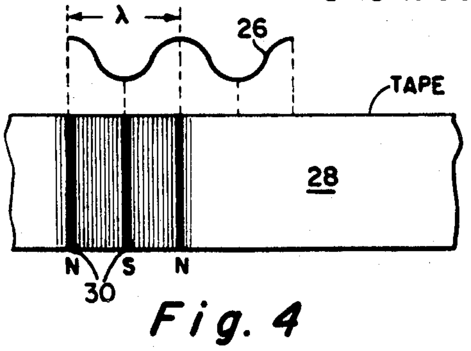
FIGS. 4 and 5 are schematic illustrations of portions of a sensitized tape on which particular electromagnetic impressions have been recorded.

Referring now to FIG. 4 of the drawings, it will be understood that when a sine wave, such as 26 is recorded on a sensitized tape 28, the variations in magnetization of the tape will be somewhat as shown schematically by the reference numeral 30. In other words, the recording density, or magnetization level, will be high during the maximum and minimum excursions of the sine wave 26, and will be negligible during the time instants when the sine wave is passing through zero. Expressed differently, the magnetization of tape 28 will be in the form of regularly spaced bands alternating in polarity in accordance with corresponding polarity changes of sine wave 26.

Figure 5:
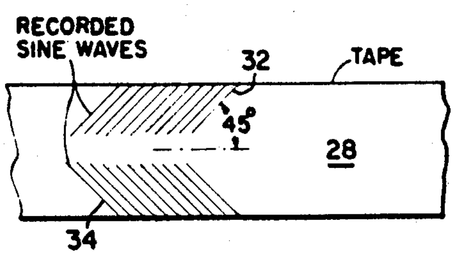

With the above background in mind, a consideration of FIG. 5 will make clear one of the basic features of the present concept. Instead of recording a single sine wave on a sensitized tape (or other storage medium) in a direction essentially normal or transverse to the direction of tape movement as indicated by the arrow, *two* sine waves are recorded each on approximately one-half of the tape width. However, these sine waves (herein given the reference numerals 32 and 34) are not recorded transversely to the direction of tape movement as in FIG. 4, but instead are recorded at an angle of 45° thereto. Furthermore, the direction of recordation of the sine waves is such that the resulting linear areas of tape magnetization lie respectively perpendicular to one another. It will be recognized that the spacing between *adjacent* linear maximum magnetization regions of opposite polarity of *each* sine wave is one-half the wavelength λ of the applied energy, as is again made clear from FIG. 4, where it is only necessary to consider the magnetization pattern 30 produced on tape 28 by the sine wave 26.

Figure 6:
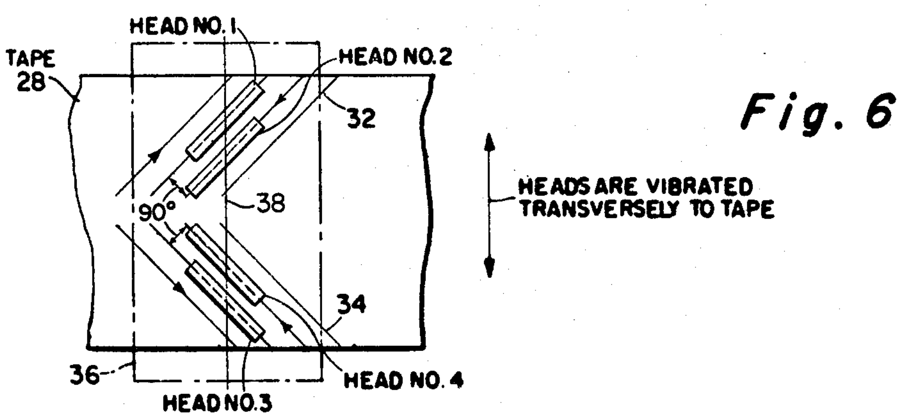
FIG. 6 is an enlargement of a portion of FIG. 5 together with one preferred form of readout assembly designed for use in conjunction therewith.

FIG. 6 is an enlarged view of a portion of tape 28 of FIG. 5 with the two sine waves 32 and 34 recorded thereon. Also shown in FIG. 6 is a readout unit 36 of a type particularly suitable for use in producing the results desired. This unit 36 may comprise a block of some insulating material, such, for example, as Lucite, in which are embedded four readout heads respectively designated by the numbers 1, 2, 3 and 4 in the drawing. The body of unit 36 is shown in broken lines in FIG. 6 in order not to obscure the tape region lying thereunder. As illustrated, heads #1 and #2 are associated with the upper portion of tape 28 on which has been recorded the sine wave 32, while in a similar manner heads #3 and #4 are associated with the lower (in the drawing) tape portion on which has been recorded the sine wave 34. It will be noted that heads #1 and #2 are oriented parallel to the magnetization lines representing sine wave 32, while heads #3 and #4 are similarly disposed parallel to the lines representing sine waves 34. Consequently, each of heads #1 and #2 is positioned at right angles to each of heads #3 and #4. Furthermore, heads #1 and #2 are spaced apart by λ/4 (or odd multiples thereof) or, in other words, by onequater the wavelength of the sine wave 32. Heads #3 and #4 are similarly spaced apart. All of the heads are aligned vertically, with the midpoint of each head lying on the vertical reference line 38. It might be noted at this time that each of the four readout heads shown in FIG. 6 should be designed so as to have extremely narrow gaps, and, in fact, heads of the single linear-conductor type may advantageously be used in this environment. A number of examples of heads having such characteristics are disclosed in applicant's copending application Ser. No. 767,239, filed Oct. 14, 1958, and now abandoned. However, reference to this copending application is purely exemplary, and other suitable types of readout units may be employed if desired as long as they possess the required characteritsics.

It will now be appreciated that the readout unit 36 is of unitary design and is capable of being displaced in position with respect to tape 28. However, when both the unit 36 and the tape 28 are stationary, and have the relationship set forth in FIG. 6, then head #1 (when connected into an electrical circuit) will read out data represented by the magnetization of a region spaced λ/4 therefrom. Heads #3 and #4 are effective to yield similar output information.

In accordance with the present invention, it is intended that the entire readout unit 36 be cyclically displaced laterally with respect to tape 28. This displacement may be in the form of a periodic vibration of the head unit. Examples of vibrators suitable for accomplishing this objective are disclosed in applicant's copending application Ser. No. 767,239 above referred to, although any means for producing a regular oscillatory movement of head 36 in a direction transverse to tape 28 will ordinarily be satisfactory. Such a relative lateral displacement between tape 28 and the head assembly will cause the individual heads to traverse areas of the tape having different degrees of magnetization, and this traverse movement will produce a sine wave output from each individual head. Furthermore, each head will produce a sine wave of equal amplitude, since both recorded sine waves are identical to one another in this respect.

The electrical connection of the heads of FIG. 6 is shown in FIG. 7, the physical relationship of the various elements being exaggerated for the sake of clarity. As illustrated therein, the electrical output of head #1 is effectively added to the electrical output of head #3, and the total variation is applied across the horizontal deflecting plates 12 of the cathode-ray tube 10 to result in the axial deflection voltage X—X. However, the output of head #4 is *subtracted* from the output of head #2, and the difference in voltage is applied to the deflection plates 14 as the axial Y—Y deflection voltage. The basis for this procedure will be recognized when it is considered that the total output of heads #1+#3 reaches a maximum value when the output of heads #2—#4 is zero, or vice versa. In this connection, it should be recalled that heads #1 and #2 are spaced apart by a distance equal to λ/4, as are heads #3 and #4. Thus, the two signals applied to plates 12 and 14, respectively, are 180° out of phase to result in the linear trace discussed in connection with FIG. 1. In addition, the varying amplitudes of the two signals applied to these plates 12 and 14 are such that they are always additive at any instant of time to yield a constant value. Therefore, with the head outputs #1+#3 being equal to X, and #2—#4 being equal to Y, $$(1+3)^2+(2-4)^2=X^2_{\text{maximum}}=Y^2_{\text{maximum}}$$

Thus the requirements for a linear trace of the cathode-ray scanning beam having been met in the manner required.

The above discussion has assumed that the tape 28 is stationary during a vibration or oscillation of the head unit 36 transversely thereto. FIG. 8*a* illustrates this condition, with a transverse head vibration but no tape movement. The trace on the screen of cathode-ray tube 10 is as shown in the drawing—that is, it is of a stationary character and has a particular angular position (45°) about the tube axis. If the tape 28 is now moved laterally and in a selected direction (as shown by the arrow in FIG. 8*b*, to the right) then the trace 16 on tube 10 will rotate in a given direction, such for example, as clockwise. This is because both the relative amplitudes and polarities of the magnetized lines over which the head unit 36 now passes are changing, during the tape movement, and head #1 (for example) will shift from a position overlying a negative tape magnetization toward a position overlying a positive magnetization, etc. It will be recalled from FIG. 1 that the linear trace 16 has a horizontal orientation when $X_a$ is maximum and vertical orientation when $X_a$ is zero. Consequently, a movement of tape 28 in FIG. 8*b* for one full wavelength (λ) will produce one complete rotation of 360° for the trace 16.

Figure 8B:
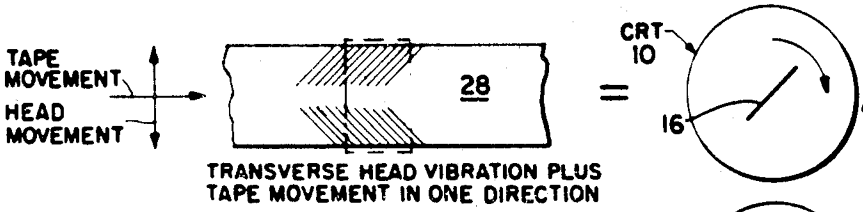
Figure 8C:
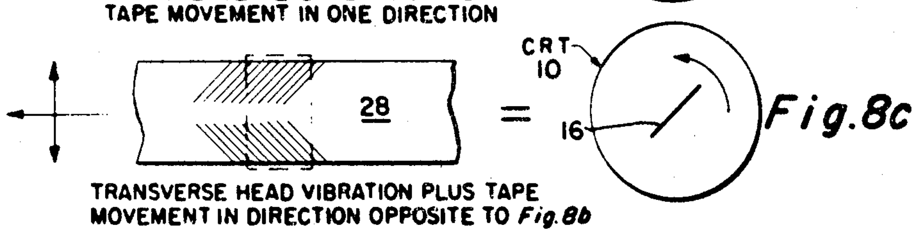

If the tape 28 is moved in a direction opposite to that of FIG. 8*b*, the trace 16 will also move in an opposite angular direction, or counterclockwise, as shown by the arrow in FIG. 8*c*. For a complete rotation of trace 16 through a 360° angle, it is only necessary that the tape 28 move through a distance equal to the spacing between three successive lines of maximum magnetization, or one full wavelength of the recorded energy.

The preceding description of the operation of applicant's invention should permit a complete understanding thereof. However, it is important to bear in mind that a distinction must be maintained between the phase relationship of the signal envelope, on one hand, and the phase of the oscillation frequency with respect to the two outputs X and Y, on the other. It must also be borne in mind that a signal having zero voltage in the X coordinate and maximum voltage in the Y coordinate (or vice versa) does not necessarily indicate that the carrier frequency is 90° out of phase.

The above statements will perhaps be better understood by recalling that the phase relationship between the two parallel heads #1 and #2 is 90°, and that, by mixing the respective outputs of the two heads, a 90° phase shift results. This is brought out in FIG. 1 of the drawings, where the direction of the arrows on the flux lines indicates the polarity maximum of the magnetic flux on the tape. It will be observed that heads #3 and #4 are 90° out of phase to one another, as well as at an angle of 90° with respect to heads #1 and #2, the latter characteristic being of significance when transverse vibration of the head assembly exceeds a level such that heads #1 and #2 pass over the magnetic impressions associated with heads #3 and #4. Since the flux lines associated with heads #3 and #4 lie normal to the longitudinal axis of heads #1 and #2, no output is generated under such circumstances and no distortion appears in the voltage variations applied to the oscilloscope.

The manner in which the phase of the two signals applied to the deflection plates of the cathode-ray tube changes when a relative movement occurs between the tape and the head assembly is clearly brought out by FIG. 9 of the drawings. In order to expand the showing in a horizontal direction, the direction of the magnetic impressions has been changed from an angle of 45° to an angle of 30°, considered with respect to the direction of tape movement. However, this has no effect upon the functioning of the device, and merely gives a clearer illustration of the magnitude of the various phase changes as a relative movement between tape and head assembly occurs.

In FIG. 9 the assumed direction of movement of heads I and II is parallel to the direction of the respective magnetic impressions over which such heads lie. This is brought out in the drawing by the arrow and its accompanying legend. Consequently, the phase of the respective outputs of heads I and II always remains constant. However, with respect to heads III and IV, they move parallel to heads I and II in a direction shown by the broken lines, and consequently a phase change occurs between the outputs thereof. This phase change is indicated in FIG. 9 of the drawings by eight incremental steps or positions designated by the numerals 1 through 9. It should be noted that in position or step #5 in FIG. 9, heads III and IV directly overlie the respective magnetic impressions with which they are associated. Since head I also overlies a magnetic impression, the additive output of heads I and III is a maximum, and the phase relationship therebetween is zero. Heads II and IV *individually* also have a maximum output, but since they are electrically connected in a subtractive manner (as shown) the combined output of these heads is zero. It should be noted in connection with heads III and IV that in moving from position 5 to position 7½, the phase angle changes by 90°—that is, from 180° to either 90° or 270°. The change in phase of head IV is illustrated by the light, or open, arrows, while the change in phase of head III is depicted by the dark, or closed, arrows. All of the heads are identical in design, and move over recorded magnetic impressions of equal area and flux. Consequently, the individual sine waves generated by the respective heads all have equal amplitudes.

In FIG. 10 of the drawings there is illustrated the respective outputs of the four heads of FIG. 9, as well as further waves representing the addition of the outputs of heads I and III, on one hand, and of heads II and IV, on the other. FIG. 10 is related to FIG. 9 in the sense that eight incremental steps are set forth corresponding to those of the previous figure. Furthermore, there is a correspondence between the dark, or closed, arrows representing the phase change in the output of head III in FIG. 9 and the light, or open, arrows indicating the change in phase of the output of head IV. Although the waves of FIG. 10 are actually sine waves which have been developed in the manner hereinabove described, they have been illustrated in this figure as triangular waves inasmuch as measurements therebetween indicating their phase relationship is facilitated by such a showing. It will be clearly understood, therefore, that these waves in reality are of sinusoidal form, and have been illustrated in linear fashion solely for clarity of description.

In the upper portion of FIG. 10, the wave representing the output of head I in FIG. 9 is designated by the reference numeral 40. Since this head moves parallel to the magnetic impression over which it lies (as previously indicated) then the voltage output therefrom as the head vibrates does not change in maximum amplitude and undergoes no phase displacement. It may consequently be termed a "reference" wave of constant form. However, the output of head III, designated in FIG. 10 by the reference numeral 42, does vary in phase with respect to the wave 40 as a relative displacement between tape and head assembly occurs in the direction of movement of the former, and the phase relationship between these two waves 40 and 42 is brought out by the "closed" arrows 44 corresponding to similar arrows in FIG. 9. FIG. 10 shows the magnitude of the arrows 44 decreasing for each incremental step 1 to 5. At step 5, however, the two waves are in phase, and add together to produce a composite wave 46 of relatively high amplitude at this point. In the lower portion of FIG. 10, the constant wave output of head II is represented by the reference numeral 48, while the varying (in phase) output of head IV is represented by the reference numeral 50. These two waves combine to produce a resultant wave 52, and the phase relationship between waves 48 and 50 is indicated by the open, or light, arrows 54. The two waves 40 and 48 (representing the respective outputs of heads I and II) are 90° out of phase with one another, as brought out by FIG. 1 of the drawings, while the two waves 42 and 50 are shown displaced in phase in accordance with the diagram of FIG. 9. It should be noted that because of the opposite electrical connection of head IV in FIG. 9 with respect to head II, the wave 50 is inverted, or, in other words, the wave 46 is a maximum when the wave 52 is zero.

Figure 3:
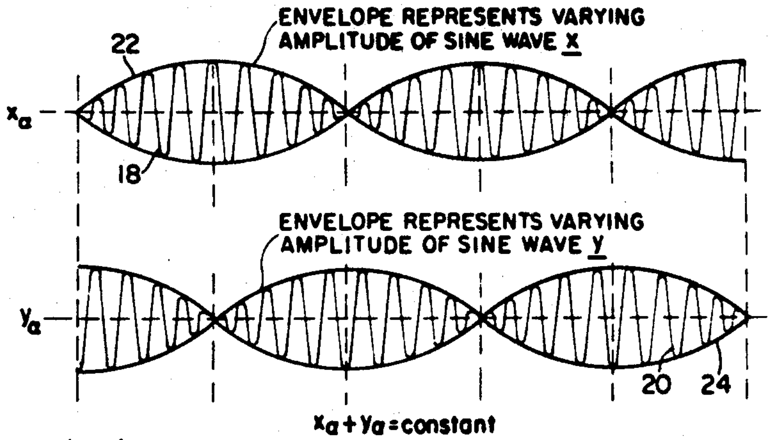
FIGS. 2 and 3 are waveforms useful in explaining the operation of the invention.

As above stated, the two individual waves 40 and 42 are added together and shown as a composite wave 46, while the two waves 48 and 50 are added together and likewise shown as a composite wave 52. Progressing through the incremental steps from 1 through 5 in FIG. 10, it will now be seen that the combined outputs of heads I and III increases to a maximum at step #5, and then decreases from step #5 to step #9. In similar fashion, the combined outputs of heads II and IV decreases from step #1 to step #5, reaches zero at this step #5, and then increases again from step #5 to step #9. FIG. 10 also shows that the two outputs (that is, *I+III* and *II+IV*) are 180° out of phase from step #1 to step #5, and have a zero phase difference from step #5 to step #9. The resulting *envelopes*, of these waves are shown in FIG. 3 of the drawings, and represent the voltage variations actually applied to the deflection plates of the cathode-ray tube 10 to develop the traces 16 of FIG. 1.

FIG. 11 illustrates the traces produced by the electron scanning beam on the screen of the cathode-ray tube for the positions or incremental steps #3 through #7 shown in FIGS. 9 and 10 of drawings. In progressing from step #3 to step #7, the trace rotates in a counterclockwise direction in the fashion shown in FIG. 8*c*. It might be pointed out, however, that each of the lines of FIG. 11 is not actually of "solid" form. Since the head assembly is vibrating in a transverse direction, the voltage output is a maximum only at the center of the vibration range, with a zero output when the vibratory movement of the head assembly changes direction. Consequently, the actual cathode-ray tube trace is somewhat as shown in FIG. 12 of the drawings, developing a higher light output at the center of the trace than at the two extremities thereof. With a cathode-ray tube having a low persistence screen, each trace would not necessarily be of uniform brightness throughout its length, but this is of no particular concern inasmuch as it is the *radial* direction of the trace that is of significance for the purpose of the invention.

Although it is believed that the above explanation will suffice to assure a clear understanding of the principles of applicant's invention, nevertheless it is possible to demonstrate the validity of the theory on which the concept is founded by means of a vectorial analysis of the type set forth in FIG. 13 of the drawings. In this figure, the vectors representing heads I and II, respectively, are 90° out of phase. The vectors representing heads III and IV are also 90° out of phase with respect to one another, and are rotating with the change of phase in relationship to heads I and II. (This statement assumes heads I and II as a fixed reference, though in actual operation vector I–II and vector III–IV are rotating in opposite directions). Inasmuch as one of the heads is connected opposite as in the head arrangement I–II, the vector IV (shown in broken lines) moves toward position IV′, 180° removed from position IV. The outputs of heads II and IV′ are added to produce a vector having the amplitude and phase of $y$, while the outputs of heads I and III are added to produce a vector having the amplitude and phase of $x$. These vectors $x$ and $y$ represent the voltages on the deflecting plates of the cathode-ray tube and produce a resultant trace such as identified by the reference numeral 56 in FIG. 14.

FIG. 15 is a vectorial analysis similar to that employed in FIG. 13 except that seven positions are depicted, corresponding to the incremental steps 2 through 8 of FIGS. 9 and 10. It should be noted that at position #5 the phase changes from 180° to zero degrees, but this is in conformity with the showing of FIG. 10 as represented by the arrows therein. FIG. 16 illustrates the presentation of the respective outputs of FIG. 15 upon the screen of a cathode-ray tube in the same manner that FIG. 14 illustrated the presentation of the single output of FIG. 13, the linear trace rotating counterclockwise as the tape moves.

In summary, it may be emphasized that, to *produce* a straight line on the screen of the cathode-ray tube, the phase relationship between the two voltages $x$ and $y$ should be 180° or a multiple thereof. In order to *rotate* such a line upon a movement of the sensitized tape (as shown in FIGS. 8*b* and 8*c* of the drawings) the head displacement I–II, as well as III–IV, must equal 90° (or a multiple of 180° plus 90°) of the recorded sine wave.

As an illustration of the manner in which the present concept is capable of depicting extremely small changes in a quantity, let it be assumed that the wavelength $\lambda$ equals 0.001″. Then, with an electron scanning beam diameter of .01″, and assuming a cathode-ray tube screen diameter of 3.3″, then the system will resolve a variation in accordance with the following formula:

$$\frac{0.001'' \times 0.01''}{3.3\pi} = 1\mu'' = 250 \text{ A.}$$

Obviously many modifications and variations of the present invention are possible in the light of the above teachings. It is therefore to be understood that within the scope of the appended claims the invention may be practiced otherwise than as specifically described.

I claim:

1. A system for representing intelligence as a function of the instantaneous angular orientation of a linear trace developed on the target electrode of a cathode-ray tube, said system comprising: a movable storage medium having recorded thereon two separate signals in the form of two sine waves of the same frequency but in opposite phase relation, the two said sine waves being respectively recorded on two laterally spaced regions of said storage medium considered transversely to its direction of movement, each of the said sine waves being represented by essential linear areas of magnetization of said storage medium, which areas are disposed side-by-side in parallel fashion at an angle of 45° to the direction of movement of said medium, so that the respective areas of magnetization representing each individual sine wave lie at an angle of 90° to the areas of magnetization representing the remaining sine wave; a unitary readout head assembly comprising four individual readout heads arranged in sets of two, one set of heads being associated with that region of said storage medium on which has been recorded one of the two said sine waves, the remaining set of heads being associated with that region of said storage medium on which has been recorded the other of said two sine waves, each of the said four readout heads being oriented parallel to the linear areas of magnetization of said storage medium and with the two heads of each set being spaced apart by a distance equal to one-half the distance between adjacent linear areas of maximum magnetization of opposite polarity representing that sine wave with which a particular set of heads is associated; means for electrically connecting the outputs of the remaining two heads in series opposition; a cathode-ray tube having two sets of deflecting plates; means for electrically connecting the combined outputs of the series-additive heads across one set of deflecting plates of said cathode-ray tube; means for electrically connecting the combined outputs of the series-opposed heads across the remaining set of deflecting plates of said cathode-ray tube; and means for causing a cyclic oscillatory displacement of said readout head assembly in a direction essentially transverse to the direction in which said storage medium is designed to move, as a result of which transverse displacement of said readout head assembly a trace is developed on the target electrode of said cathode-ray tube which is linear in nature and which has an angular orientation dependent upon the positional relationship between said readout assembly and said storage medium considered with respect to the direction in which the latter is designed to move.

2. A system for representing intelligence as set forth in claim 1, wherein a selected movement of said storage medium causes an angular rotation of the linear trace developed on the target electrode of said cathode-ray tube, the degree of such rotation being a function of the amount by which said storage medium moves in a direction normal to that in which said head assembly is cyclically displaced.

3. An intelligence representing a system as set forth in claim 1 in which said storage medium is a sensitized tape.

4. An intelligence-representing system as set forth in claim 1 in which said readout head assembly comprises a block of insulating material in which said four heads are embedded.

5. A method of representing intelligence as a function of the instantaneous angular orientation of a linear trace developed on the target electrode of a cathode-ray tube, which method comprises recording a pair of out-of-phase sine waves side-by-side upon an elongated movable storage medium, reading out the individual stored energies by effecting a periodic transverse displacement between such storage medium and the readout member so that the latter cyclically scans the storage medium in a direction normal to that in which the said medium is designed to move, and then selectively combining the derived data representing the individual stored energies so that the resultant signals may be applied to said cathode-ray tube to produce a linear trace on the target electrode thereof.

References Cited

UNITED STATES PATENTS

| | | | |
|---|---|---|---|
| 2,902,673 | 9/1959 | Hare | 179—100.2 |
| 2,905,521 | 9/1959 | Hollabaugh | 340—174.1 |
| 2,929,670 | 3/1960 | Garrity | 346—74 |
| 2,932,002 | 4/1960 | Keiser | 179—100.2 |
| 2,938,962 | 5/1960 | Konins et al. | 179—100.2 |
| 3,092,815 | 6/1963 | Hinze | 340—174.1 |
| 3,332,059 | 7/1967 | Ritter | 179—100.2 |
| 3,378,825 | 4/1968 | Offner | 179—100.2 |

BERNARD KONICK, Primary Examiner

VINCENT P. CANNEY, Assistant Examiner

U.S. Cl. X.R.

179—100.2